Oct. 18, 1949.　　　E. M. ANDERSON　　　2,484,924
FLUID COUPLING
Filed June 30, 1948　　　　　　　　　　　　2 Sheets-Sheet 1
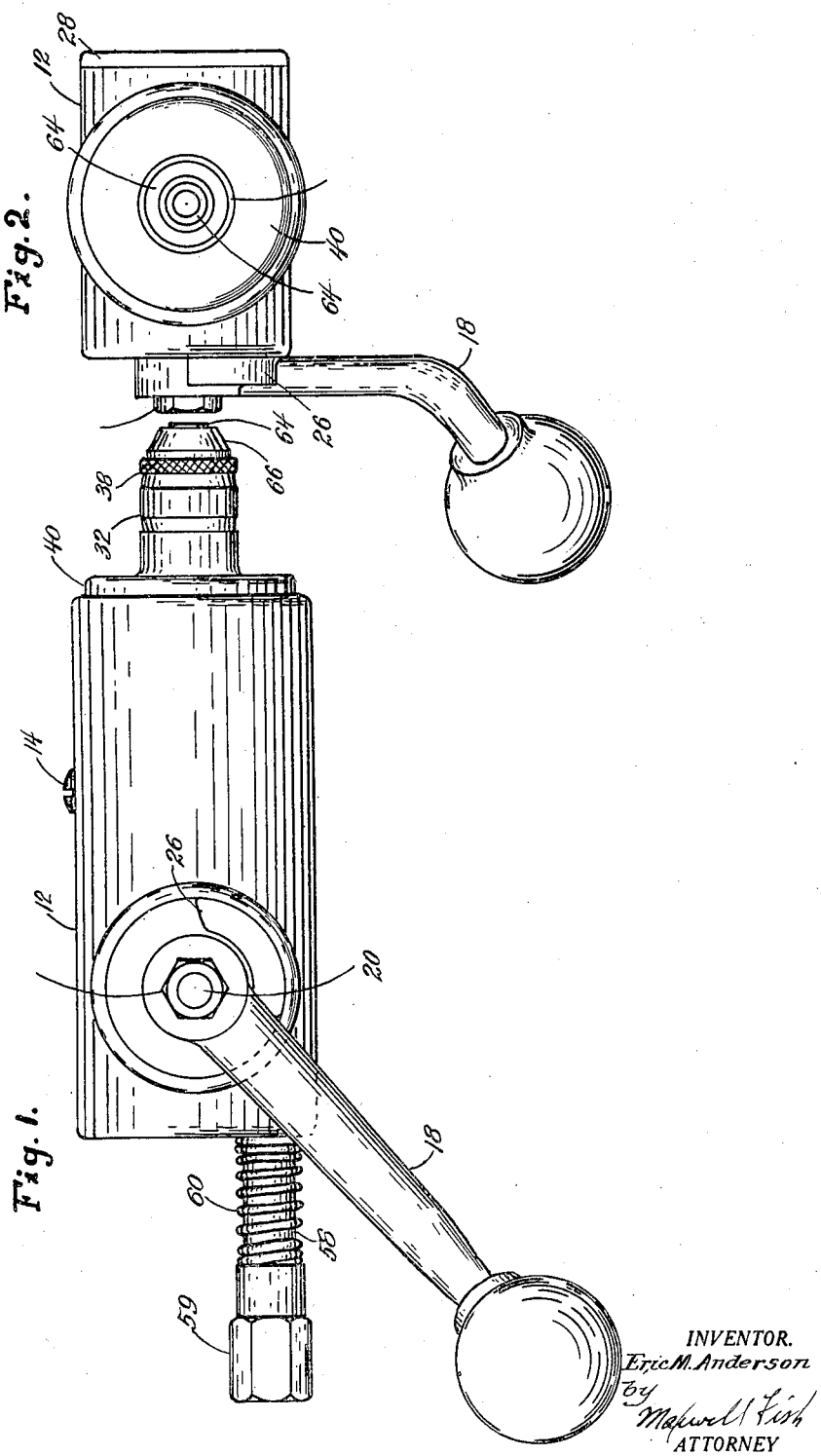
INVENTOR.
Eric M. Anderson
by
Maxwell Fish
ATTORNEY Oct. 18, 1949.                    E. M. ANDERSON                    2,484,924
                                  FLUID COUPLING
Filed June 30, 1948                                           2 Sheets-Sheet 2

INVENTOR.
Eric M. Anderson
BY Maxwell Fish
ATTORNEY

Patented Oct. 18, 1949

2,484,924

UNITED STATES PATENT OFFICE 2,484,924

FLUID COUPLING

Eric Martin Anderson, Westbrook, Maine, assignor to Utilities Distributors, Inc., a corporation of Maine Application June 30, 1948, Serial No. 36,245

6 Claims. (Cl. 284—18)

This invention relates to improvements in fluid couplings, and more particularly to an improved detachable valve coupling unit adapted to be coupled to a nipple for the transfer of a gaseous fluid under pressure through the coupling and associated nipple. The invention is intended as an improvement upon the detachable valve coupling units illustrated in the copending applications for Letters Patent in the United States Patent Office of Kelso Serial No. 623,138, filed October 18, 1945, and Anderson et al. Serial No. 699,796, filed September 27, 1946, which applications have become Letters Patent No. 2,444,451 and 2,444,414 respectively.

Objects of the invention are to provide a valve coupling unit which is of simple and improved construction, which operates with certainty to grip and to release the nipple to be coupled and to open and close in a predetermined sequence of operations, and which is well adapted to maintain a fully gas-tight connection through the coupling unit to prevent escape of the highly volatile and dangerous fluid medium to atmosphere.

Figure 3:
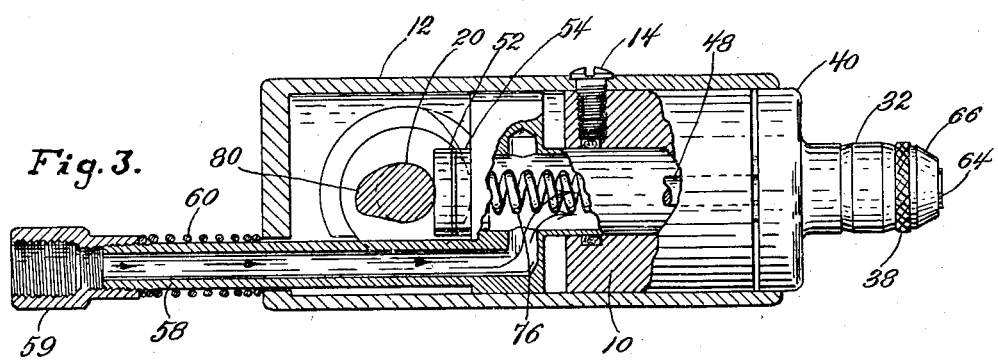
Figure 4:
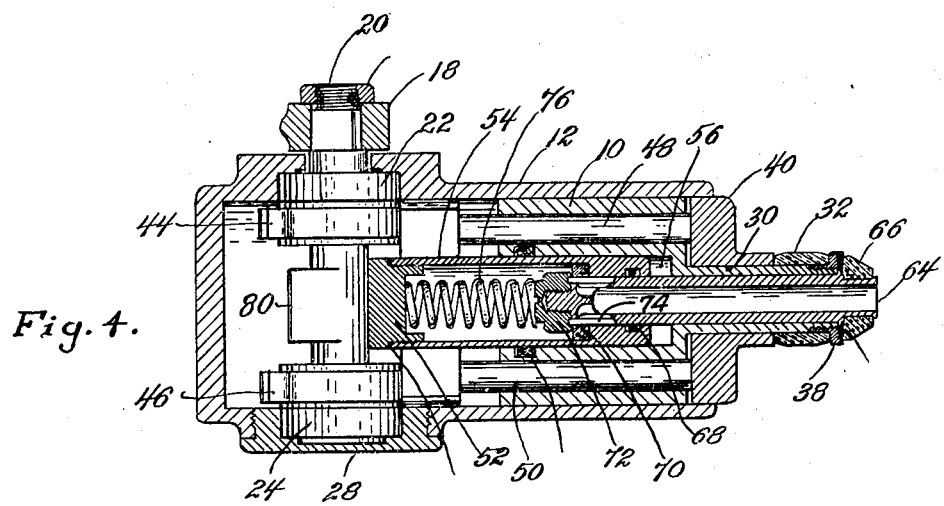
Figure 5:
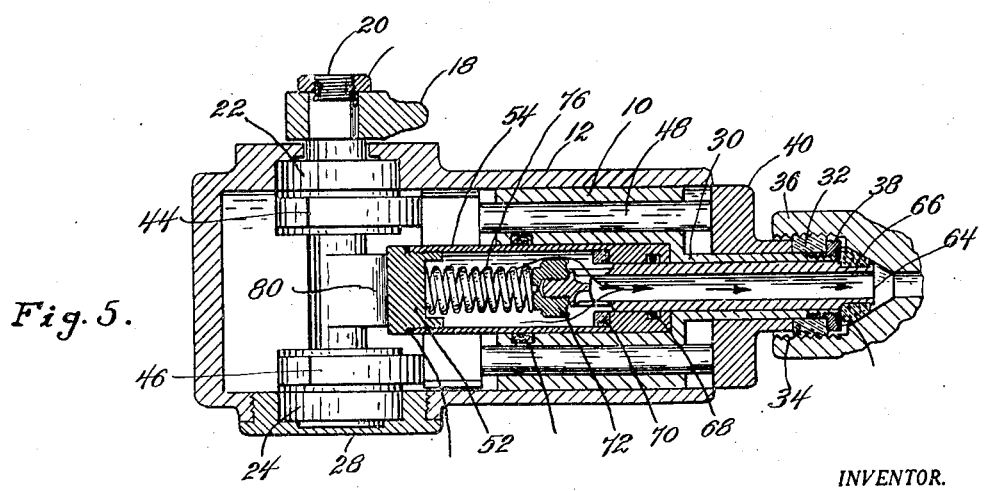

With these and other objects in view as may hereinafter appear, the several features of the invention consist also in the devices, combinations and arrangement of parts hereinafter described and claimed, which together with the advantages to be obtained thereby will be readily understood by one skilled in the art from the following description taken in connection with the accompanying drawings, in which Fig. 1 is a view in side elevation of a valve coupling unit embodying in a preferred form the several features of the invention; Fig. 2 is an end view of the valve illustrated in Fig. 1 looking from the right; Fig. 3 is a view similar to Fig. 1, but with the operating handle removed and portions of the valve coupling unit broken away along a mid-sectional line to illustrate underlying parts; Fig. 4 is a bottom plan view taken on a mid-sectional line of the valve illustrating substantially the parts in Fig. 3; and Fig. 5 is a view similar to Fig. 4, but with the valve shown in coupled relation to a nipple and with the coupling shut-off valve open.

The improved valve coupling unit herein disclosed as embodying in a preferred form the several features of the invention, comprises generally a cylindrical housing or supporting body for the unit which provides support for a gripping device in the form of a gripper band of resilient material which is readily movable within the threaded portion of the nipple and is adapted when compressed axially to expand into gripping engagement with the threads of the nipple. There is also provided a fluid conduit through the coupling unit including an axially shiftable fluid conduit defining member and a tubular conduit extension which is supported in telescopic relation to the conduit defining member and is arranged to project through the gripper into engagement with the nipple to be coupled. The fluid conduit defining member and the equal tubular conduit extension provide support for the respective valve and seating elements of a shut-off valve within the coupling unit. A relative advancing movement of the conduit defining member while the tubular conduit extension is held by engagement with a nipple has the effect of opening the valve.

Further in accordance with the invention, the tubular conduit extension is provided at its outer end with a sealing ring of resilient material for engagement with the nipple and a sealing ring of resilient material is interposed between the telescopically-arranged conduit defining member and tubular extension providing a gas-tight seal therewith.

A fluid conduit assembly arranged as above described to include the telescopically-arranged conduit extension and sealing element associated therewith, has been found to cooperate in a most efficient manner with an expandable gripper-band type of coupling device for attaching the coupling unit to the nipple to provide a gas-tight seal through the conduit and nipple.

Further in accordance with the invention, an improved mechanism is provided for controlling the operation of the gripper and shut-off valve in the desired sequence of operation from a manually operable controller. In the illustrated construction, the actuating mechanism takes the form of a transversely extending cam shaft supported in the casing and having a manually operable control handle mounted on one end thereof. With the present construction, the gripper ring is arranged to be acted upon by a flanged compression member and a pair of actuating pins or plungers which are arranged to be actuated by cams on the cam shaft. After the gripper ring has been expanded into gripping engagement with the nipple, a second operating cam means becomes operative to advance the fluid conduit defining member so that the seal at the forward end of the conduit tubular extension is brought into sealing engagement with the nipple to provide a gas-tight connection of the conduit through the coupling and nipple. Further advancing movement of the conduit defining member then acts to open the valve.

Referring more specifically to the drawings, the coupling unit herein disclosed as embodying in a preferred form the several features of the invention, comprises a cylindrical housing or supporting body for the unit including a cylindrical plug 10 and casing 12 secured thereto by means of a locking screw 14. The unit is arranged to be operated by means of a hand lever 18 attached to one end of a transversely extending cam shaft 20 which is mounted to turn in bearings 22, 24 in the casing 12. Rotational movement of the hand lever 18 in each direction is limited by the engagement of a portion of the handle near its base with a lug 26 on the casing 12. The handle is movable in a clockwise direction from the disengaged valve closed position of Fig. 1, to an alternative engaged valve open position in which the handle is again engaged with lug 26. For convenience of assembly of the parts, the bearing support 24 for the cam shaft 20 is carried in a supporting cap member 28 of relatively large diameter screw-threaded into the side of the casing 12.

For attaching the unit to a nipple to be coupled, the supporting body or plug is provided with a cylindrical extension 30 of reduced diameter having mounted thereon a gripper band 32 of resilient material which may, for example, be artificial rubber, and which is adapted when compressed axially to expand into gripping engagement with the threads 34 of a nipple 36 to be coupled as shown in Fig. 5. The gripper band 32 is supported at its outer end against an abutment provided by a flanged ring 38 screw-threaded to the outer end of the tubular extension 30, and at its inner end is arranged to be engaged by a flanged compression sleeve member 40 sleeved on the tubular extension 30. The member 40 is actuated by two similar cams 44, 46 on the cam shaft 20, which engage against the ends of two plungers 48, 50 interposed between the cams and the face of the compressing member 40. The plungers 48, 50 are slidably supported in drills extending parallel to the axis of the plug at each side thereof.

The conduit through which a liquid gas or other fluid medium is passed through the coupling, comprises a fluid conduit defining member which consists of a transversely disposed hollow block 52 having attached thereto a forwardly extending cylinder 54 slidably supported in a central bore 56 in the plug 10, and a rearwardly extending tube 58 offset at one end of the plug 52 and projecting rearwardly through an aperture in the casing 12. The tube 58 is arranged to be connected by means of a coupler 59 with a supply line (not shown) which may be of ordinary description. A compression spring 60 coiled about the tube 58 between the outer face of the casing 12 and the shouldered end of the coupler 59 acts to maintain the conduit defining member in its fully retracted position in which the block 52 is engaged against an abutting surface of the cam shaft 20 as shown in Figs. 3 and 4. A tubular conduit extension 64 of the fluid conduit is telescopically fitted to the forward end of the cylinder 54 and is further supported for sliding movement within the tubular extension 30 of the plug 10. At its forward end the tubular conduit extension 64 projects from the cylindrical extension 30, and is fitted with a nipple engaging tapered sealing ring 66 which may be of any suitable resilient material such as artificial rubber, and serves to provide a gas-tight connection between the fluid conduit and nipple. A sealing ring 68 of artificial rubber which is housed within an annular groove in the cylinder 54 for engagement with the external periphery of the tubular conduit extension 64, serves to provide a gas-tight seal between the cylinder 54 and the tubular conduit extension 64 telescopically fitted thereto.

The cylinder 54 and extension 64 are constructed and arranged to provide a shut-off valve in the conduit which is opened to permit the discharge of fluid therefrom only when the extension 64 is brought into engagement with the co-operating surface of a nipple. The elements of the valve comprise a valve seat in the form of a seating ring 70 mounted against a shoulder within the cylinder 54 and a valve cover or cap 72 mounted on the inner end of the tubular extension 64 for engagement with the seat 70. Slots 74 formed in the sides of the extension 64 provide passageway for the fluid medium from the cylinder 54 into the tubular extension when the valve is open. A coiled compression spring 76 seated at one end against the valve cap 72 and at its other end against the transversely extending block 52 tends to hold the tubular conduit extension 64 in its fully extended position with relation to the cylinder 54 and with the valve closed.

The operation of the coupling unit may be briefly described as follows: Starting with the "off" position shown in Figs. 1 to 4 inclusive, the coupling unit is first placed in position with the extending portion thereof including the gripper band 32 well within the nipple 36. The operator now rotates the hand lever 18 in a clockwise direction through approximately a half revolution to shift the unit to its engaged valve open position. During the early part of this movement of the hand lever 18, the cams 44, 46 engage the plungers 48, 50 respectively, to force the plungers 48, 50 and flanged compressing member 40 forwardly, thus axially compressing the band 32 against the ring 38 so that it is expanded radially into gripping engagement with the internal threads 34 of the nipple 36. Continued rotational movement of the handle 18 and shaft 20 now causes a cam 80 formed on the middle portion of cam shaft 20 to be brought into engagement with the adjacent portion of the block 52, so that the conduit defining member, of which block 52 is a part, is caused to move forwardly with relation to the housing comprising plug 10 and casing 12. The advancing movement of the conduit defining member including cylinder 54 and tubular conduit extension 64 causes the sealing ring 66 carried on the outer end of the tubular conduit extension to be brought into sealing engagement with the nipple 36 as best shown in Fig. 5, where it is held by the action of spring 76, so that a gas-tight seal is provided through the fluid conduit and nipple 36. Continued advancing movement of the fluid conduit defining member including block 52 and cylinder 54 while the tubular conduit extension 64 is held stationary, causes the valve member 72 to leave its seat 70 to open the shut-off valve in the coupling unit.

When it is desired to disconnect and to remove the coupling unit from the nipple 36, the handle 18 is again rocked rearwardly away from the nipple. Operating cam 80 is first withdrawn to permit the movement of the fluid conduit defining member rearwardly under the influence of spring 60 to the position shown in Fig. 4, in which the valve 70, 72 is closed under the influence of its spring 76. Continued rotational movement of the hand lever 18 and cams 44, 46 to the fully disconnected valve shut-off position of Fig. 4, now causes cams 44, 46 to be moved out of engagement with the pins 48, 50 to release the axial pressure upon the gripper band 32, and thus to release the coupling unit from the nipple 36.

It will be understood that the invention is not limited to the specific embodiment shown, and that various deviations may be made therefrom without departing from the spirit and scope of the appended claims.

What is claimed is:

1. A detachable fluid valve coupling unit having, in combination, a housing, an expandable gripper of resilient material carried by the housing for gripping engagement with the internal periphery of the nipple to be coupled, actuating means for the gripper, a fluid conduit defining member shiftable in the housing toward the nipple to be coupled, a shut-off valve assembly carried by the conduit defining member including a tubular conduit extension shiftable relatively to the conduit defining member between an extended valve closing position, and a retracted valve open position, means supporting the extension yieldably in the valve closing position, a resilient nipple engaging sealing surface carried by said tubular conduit extension, and actuating mechanism acting when rendered operative to expand the gripper, and thereafter to shift the conduit defining member to engage said sealing surface with the nipple and to open the valve.

2. A detachable fluid valve coupling unit having, in combination, a housing, an expendable gripper carried by the housing for gripping engagement with the internal periphery of the nipple to be coupled, a shut-off valve assembly shiftable in the housing toward the nipple to be coupled and including a tubular fluid conduit extension arranged to be engaged against the obstruction provided by the nipple to be coupled to open the valve, a resilient sealing surface on said tubular fluid conduit extension for effecting a sealing engagement of the tubular fluid conduit member with the nipple, a manual control element carried by the housing shiftable from an off to an on position, and connections rendered operative by said shift to the on position first to expand the gripper against the nipple and thereafter to advance the shut-off valve assembly to move the tubular fluid conduit extension into sealing engagement with the nipple and to open the valve.

3. A detachable fluid valve coupling unit having, in combination, a housing, a gripper on the housing movable to engage with and to firmly secure the housing to the nipple to be coupled, a fluid conduit defining member shiftable in the housing toward the nipple to be coupled, a shut-off valve assembly carried by the conduit defining member including a tubular conduit extension shiftable relatively to the conduit defining member between an extended valve closing position, and a retracted valve open position, means supporting the tubular conduit extension yieldably in the extended valve closing position, a resilient nipple engaging sealing surface carried by said tubular conduit extension, and actuating mechanism acting when rendered operative to actuate the gripper to secure the housing to the nipple, and thereafter to shift the conduit defining member to engage said sealing surface of the conduit extension with the nipple to form a gas-tight connection between said tubular extension and the nipple, and to effect a retracting movement of the tubular extension relative to the conduit defining member to open the valve.

4. A detachable fluid valve coupling unit having, in combination, a housing, a gripper on the housing movable to engage with and to firmly secure the housing to the nipple to be coupled, a fluid conduit defining member shiftable in the housing toward the nipple to be coupled comprising a cylindrical tube, a tubular conduit extension supported in telescoping relation to said cylindrical tube, a shut-off valve connection between said tube and extension rendered operative by movement of the extension to an extended position relative to the tube to close the valve and by a retracting movement of said extension relative to the tube to open the valve, means supporting the extension yieldably in the extended valve closing position, a resilient nipple engaging sealing surface fixed to said extension for engagement with the nipple to form a gas-tight connection between said tubular extension and the nipple, and actuating mechanism acting when rendered operative to actuate the gripper to secure the housing to the nipple and thereafter to shift the conduit defining member toward the nipple to establish said gas-tight connection and to open the valve.

5. A detachable fluid valve coupling unit having, in combination, a housing, an axially compressible and radially expandable gripper of resilient material carried by the housing for gripping engagement with the nipple to be coupled, actuating means for axially compressing the gripper, a shut-off valve assembly shiftable in the housing toward the nipple to be coupled and including a cylindrical tube, a tubular fluid conduit extension supported in telescoping relation to the tube, and a shut-off valve connection between said tube and extension rendered operative by movement of the extension to an extended position relative to the tube to close the valve and by a retracting movement of said extension relative to the tube to open the valve, a resilient sealing surface fixed on the tubular extension for engagement with the nipple to effect a gas-tight connection between said tubular extension and nipple, a ring of resilient material interposed between said telescoping tube and extension to effect a gas-tight sealing connection therebetween, and connections acting when rendered operative for actuating said gripper and for shifting said shut-off valve assembly toward the nipple to be coupled to engage the sealing surface therewith and to open the valve.

6. A detachable fluid valve coupling unit having, in combination, a housing including a portion of reduced diameter arranged to project within the nipple to be coupled, an axially compressible and radially expandable gripper of resilient material carried on said reduced portion of the housing, a gripper compressing element sleeved on said reduced portion of the housing, actuating plungers disposed axially of the housing to act on said gripper actuating element, a fluid conduit defining member shiftable in the housing toward the nipple to be coupled comprising a cylindrical tube, a tubular conduit extension supported in telescoping relation to said cylindrical tube, a shut-off valve connection between said tube and extension rendered operative by movement of the extension to an extended position relative to the tube to close the valve and by a retracting movement of said extension relative to the tube to open the valve, means supporting the extension yieldable in the extended valve closing position, a resilient nipple engaging sealing surface fixed to said extension for engagement with the nipple to form a gas-tight connection between said extension and the nipple, a transversely extending cam shaft, cams on said shaft for actuating said plungers to expand the gripper, and a cam on said shaft for shifting said fluid conduit defining member toward the nipple after the gripper is moved to engaging position.

ERIC MARTIN ANDERSON.

No references cited.